(12) United States Patent
Tien et al.

(10) Patent No.: US 7,142,766 B2
(45) Date of Patent: Nov. 28, 2006

(54) VARIABLE OPTICAL ATTENUATOR DERIVED FROM SOL-GEL MATERIAL AND MANUFACTURING METHOD THEREOF

(75) Inventors: Pei Tien, Kaohsiung (TW); Guang-Way Jang, Hsinchu (TW); A K Chu, Kaohsiung (TW); Jing-Yuan Lin, Tuchen (TW); Ya-Hui Lin, Hsinchu (TW); Mei-Chih Hung, Changhua (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 10/940,083

(22) Filed: Sep. 14, 2004

(65) Prior Publication Data
US 2006/0051046 A1 Mar. 9, 2006

(30) Foreign Application Priority Data
Sep. 7, 2004 (TW) .............................. 93127023 A

(51) Int. Cl.
*G02B 6/00* (2006.01)

(52) U.S. Cl. ...................................... 385/140; 385/134
(58) Field of Classification Search ................ 385/134, 385/140
See application file for complete search history.

(56) References Cited

U.S. PATENT DOCUMENTS
2001/0046363 A1* 11/2001 Purchase et al. ............ 385/140
* cited by examiner

*Primary Examiner*—Jennifer Doan
(74) *Attorney, Agent, or Firm*—Thomas, Kayden, Horstemeyer & Risley

(57) ABSTRACT

A variable optical attenuator and a method of manufacturing thereof are described. First, a bottom cladding is formed on a substrate. A waveguide structure having a core region and an attenuation region is subsequently formed on the bottom cladding by photolithography. A top cladding is then formed on the bottom cladding and the waveguide structure, and an electrode is next disposed thereon and is aligned above the attenuation region of the waveguide structure. Further, the waveguide structure is composed of a sol-gel material, which is obtained by mixing a solution of metal alkoxide with a solution of organically modified Si-alkoxide and heating the same.

24 Claims, 7 Drawing Sheets

VARIABLE OPTICAL ATTENUATOR DERIVED FROM SOL-GEL MATERIAL AND MANUFACTURING METHOD THEREOF

FIELD OF THE INVENTION

The present invention relates to a variable optical attenuator, and more particularly, to a variable optical attenuator that is derived from sol-gel materials and a method of manufacturing the same.

BACKGROUND OF THE INVENTION

With the rapid growth of optical networks, variable optical attenuators (VOAs) play an important role in the implementation of long-distance communication and metro area networks. For example, variable optical attenuators diminish differences of optical power between wavelength channels in wave division multiplexing (WDM) optical networks, and maintain the signal-to-noise ratios of the channels. Additionally, variable optical attenuators are commonly used to provide gain equalization in optical amplifiers, or to monitor and distribute optical power of a cross-connected network dynamically in a dense wave division multiplexing (DWDM) system.

Mechanical variable optical attenuators adjust optical attenuations through controlling optical coupling efficiency by moving fibers, mirrors, polarizers, and so forth. Unfortunately, the substantial volume of mechanical variable optical attenuators is usually too large to miniaturize or integrate the variable optical attenuators into a module. Variable optical attenuators controlled by micro electromechanical system (MEMS) provide downsized arrays of variable optical attenuators, which can be applied to a miniaturized module. However, fabricating such variable optical attenuators is so complicated that producing the same on large scale is time-consuming. On the other hand, electro-optic (EO) attenuators or thermo-optic (TO) attenuators modify optical attenuations according to refractive indices of specific materials therein altered by imposing different electric fields or different temperatures, respectively. Hence, one of the utmost issues for manufacturing EO or TO attenuators is to supply adequate optical applied materials.

To meet the needs of growing metro area networks, higher levels of device performance and low-cost components are necessary for variable optical attenuators. Another trend for advancing variable optical attenuators is integrating the same into an optical integrated circuit (OIC), which is similar to forming an integrated circuit (IC) in the semiconductor industry. Consequently, relevant researchers and manufacturers are devoted to developing novel materials or processes, or to miniaturizing or integrating optical devices, so as to reduce cost and enhance the properties of variable optical attenuators.

SUMMARY OF THE INVENTION

It is the objective of the present invention to provide a variable optical attenuator and a manufacturing method thereof, by which a variable optical attenuator is easily integrated with other optical components to be an integrated module. Therefore, a low-cost and downsized variable optical attenuator is fabricated, which further aids in mass production of variable optical attenuators.

According to the aforementioned objective of the present invention, a variable optical attenuator derived from a sol-gel material and a method of manufacturing the same are provided.

In accordance with a preferred embodiment of the present invention, a sol-gel material with transmission above 90% in wavelengths of optical communication is obtained by reacting a solution of metal alkoxide with a solution of organically modified Si-alkoxide. The resultant sol-gel material also possesses a large refractive index-to-temperature coefficient, which defines the variation of refractive index with temperature. Additionally, a device structure derived from the sol-gel material can be constructed by employing a photolithography process. As a result, the variable optical attenuator formed by means of the material and the photolithography process costs less, and mass production of variable optical attenuators is thus readily conceivable. Moreover, a variable optical attenuator based on a buried waveguide structure or on a ridge waveguide structure is fabricated. Such a variable optical attenuator is further applied to an optical integrated circuit, which has advantages of being miniaturized and integrated with other optical components to be an optical module.

BRIEF DESCRIPTION OF THE DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF THE PREFERRED EMBODIMENTS

Variable optical attenuators are fabricated using sol-gel materials, which have characteristics of; for example, high thermo-optic effect, feasibility to be manufactured by semiconductor processes, and applicability to mass production. Therefore, the goals to lower manufacturing cost and formation of compact optical devices are achieved. A sol-gel material, a variable optical attenuator, and a method for preparing the variable optical attenuator derived from the sol-gel material in accordance with the preferred embodiments of the present invention are disclosed in detail as follows, taken in conjunction with the accompanying drawings.

Embodiment 1

A preparation method for a sol-gel material and properties of the sol-gel are revealed in this preferred embodiment.

Figure 1A:
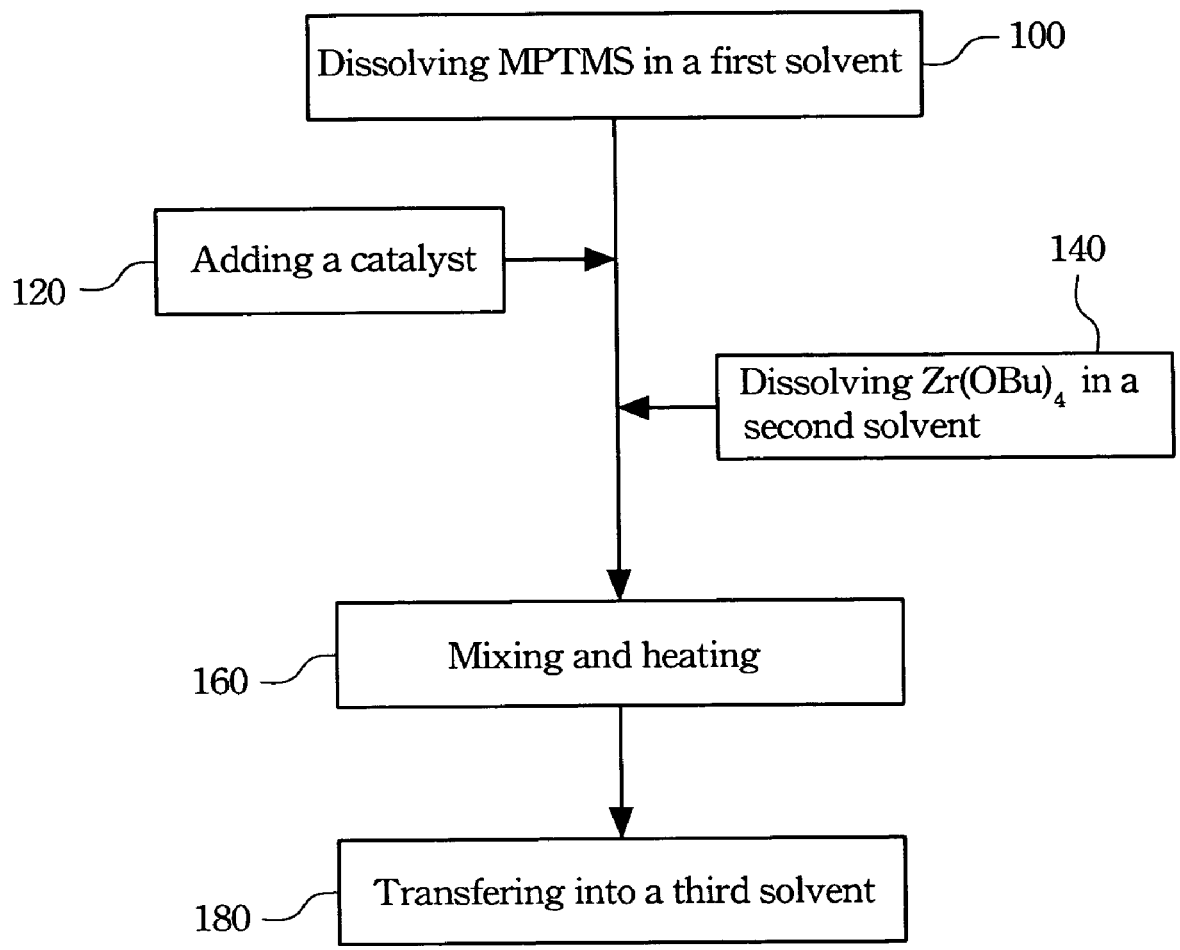
FIG. 1A illustrates a flowchart of preparing a sol-gel material in accordance with a preferred embodiment of the present invention.

The procedure of preparing a sol-gel material is shown in FIG. 1. In the embodiment, zirconium butoxide ($Zr(OBu)_4$), a kind of metal alkoxide, and methacryloxypropyl tri-methoxysilane (MPTMS), a kind of organically modified Si-alkoxide, are preferably used as precursors of inorganic materials and organic materials, respectively. As a result, an organic-inorganic sol-gel material is prepared. Referring to FIG. 1, MPTMS is dissolved in a first solvent to form a first solution with a weight ratio of about 1:2, in step 100. The first solution is then stirred for around 30 to 60 minutes. A catalyst, for instance, 0.1N hydrochloride (HCl) solution, is further added to the first solution for aiding the hydrolysis of the MPTMS, in step 120.

In step 140, a second solution is formed by dissolving zirconium butoxide in a second solvent, which is stirred for about 10 to 30 minutes. The zirconium butoxide weighs approximately the same as the second solvent. The zirconium butoxide is further proportional to the MPTMS with a molar ratio of from about 1:1 to about 1:10, and preferably from about 1:2 to about 1:5. The first solution and the second solution are next mixed and heated for a period of time, in step 160. The sol-gel material is thus formed. Furthermore, the first solvent and the second solvent are both tetrahydrofuran (THF) in the preferred embodiment, and the heating temperature is around 65° C. In step 180, the mixed solution with the sol-gel material is transferred into a third solvent to be a third solution thereafter. The boiling point of the third solvent is smaller than those of the first solvent and the second solvent, and the amount of the third solvent is less than the total amount of the first solvent and the second solvent. Therefore, the solid content of the sol-gel material remaining in the third solvent is increased when the first solvent and the second solvent are removed by heating. The third solvent is preferably propylene glycol monoether acetate (PMAc) in this embodiment.

Figure 1B:
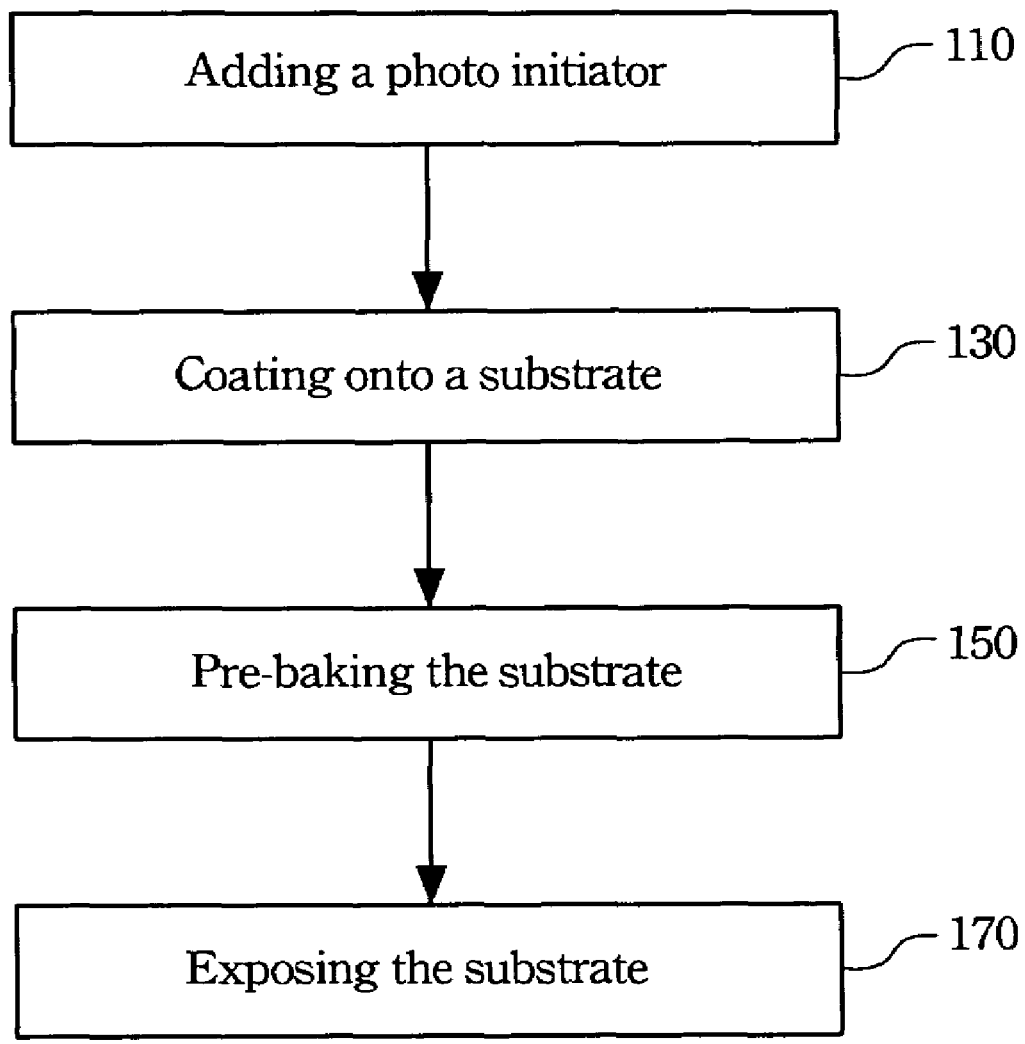
FIG. 1B illustrates a flowchart of preparation for testing characteristics of the sol-gel material synthesized according to FIG. 1.

FIG. 1B shows a flowchart of the preparation of the sol-gel material prior to property tests of the sol-gel material. As illustrated in FIG. 1B, a photo initiator is first added to the third solution mentioned above. The quantity of the photo initiator is usually about 2.5% to 10%. The mixture of the third solution and the photo initiator is then filtered and coated onto a glass substrate by a spin-coating process, in step 130. Referring to step 150 and step 170, the glass substrate is pre-baked at around 150° C. and subsequently exposed during a photolithography process.

The exposed glass substrate with the sol-gel material thereon is then examined by several property tests. The transmission of the sol-gel material coated on the glass substrate is highly transparent (above 90%) in the visible range of 400 nm to 700 nm and in the wavelength of 1310 nm and 1550 nm proven by an absorption spectrum thereof from an ultraviolet-visible-near infrared (UV-vis-NIR) spectrophotometer. The refractive index of the sol-gel material $(Zr(OBu)_4:MPTMS \approx 1:2)$ is 1.5217±0.0001 at 1310 nm measured by a prism coupler. Furthermore, the refractive index-to-temperature coefficient (dn/dT) of the sol-gel material $(Zr(OBu)_4:MPTMS \approx 1:2)$ is measured by a Mach-Zehnder interferometer. The measured results show that the refractive index-to-temperature coefficients of the sol-gel material are $-9.38 \times 10^{-5}$ 1/K and $-1.56 \times 10^{-4}$ 1/K at wavelength equaling 633 nm and 1300 nm, respectively, between absolute temperature 303 K and 353 K. These results indicate that the variation of refractive index is greatly dependent on temperature. Hence, the sol-gel material has a large thermo-optic effect. In addition, the coefficient of thermal expansion (CTE) of the sol-gel material in accordance with the preferred embodiment is measured by thermal mechanical analysis (TMA). The outcome is 6.47 ppm/° C. at 40–100° C. and 2.64 ppm/° C. at 60–140° C., thus showing that the coefficient of thermal expansion of the sol-gel material is relatively low.

Embodiment 2

A variable optical attenuator is prepared using the sol-gel material of Embodiment 1. A buried waveguide structure is further employed as a base structure for a variable optical attenuator in accordance with the preferred embodiment. The variable optical attenuator based on the buried waveguide structure is fabricated, taking advantage of well optical properties of the aforesaid sol-gel material and performing photolithography processes. Consequently, mass production of such variable optical attenuator is feasible. A flowchart of preparing the variable optical attenuator according to the preferred embodiment is illustrated in crosssectional views in FIG. 2A to FIG. 2F. Moreover, the buried waveguide structure is further applied to a dense planar lightwave circuit. Hence the variable optical attenuator is integrated with other optical components to be an integrated optical module easily.

Figure 2A:
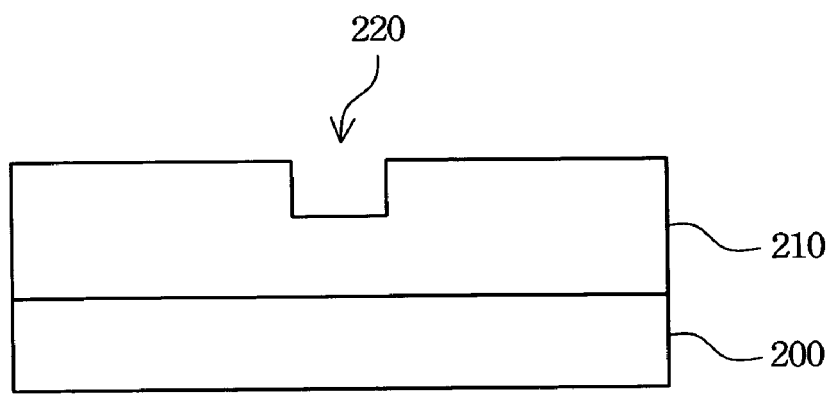
FIGS. 2A–2F illustrate cross-sectional views of preparing a variable optical attenuator in accordance with another preferred embodiment of the present invention.
Figure 2B:
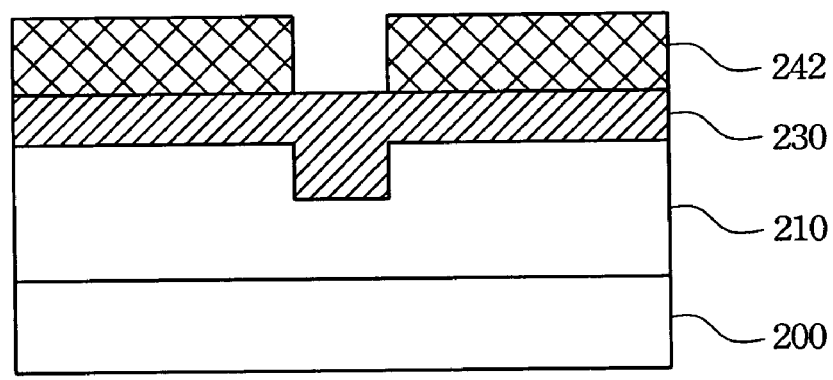
Figure 2C:
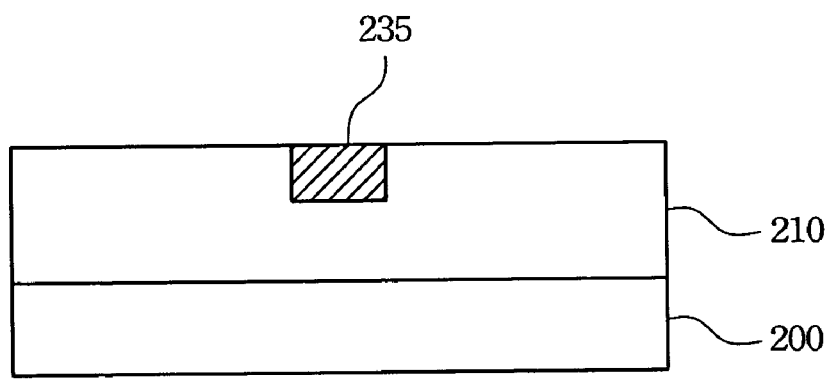
Figure 2D:
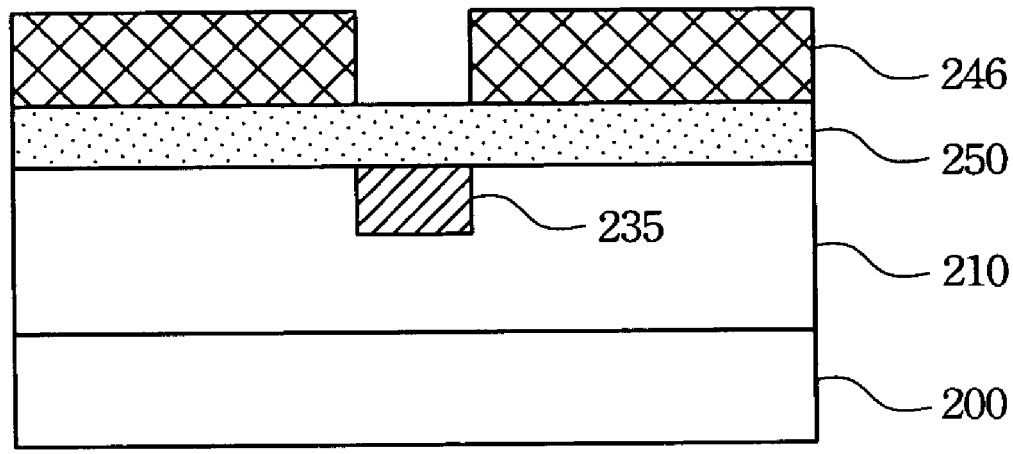

Referring to FIG. 2A, a bottom cladding 210 is formed on a silicon substrate 200 to prevent light leakage out of the silicon substrate 200, and a trench 220 is then etched thereon as a main body of a buried waveguide structure. Another cross-section of the buried waveguide structure angled to the buried waveguide structure of FIG. 2A at 90 degrees is shown in FIG. 2F. The main body of the buried waveguide structure includes an attenuation region 255 and a core region 235 when observed along the light-proceeding direction 295, as illustrated in FIG. 2F. Referring back to FIG. 2B and FIG. 2C, a photosensitive material 230 is coated on the bottom cladding 210 and the trench 220. A mask layer 242 having an opening is subsequently formed thereon. Exposure, removal of the mask layer 242, removal of the photosensitive material 230 under the mask layer 242 by developing, and baking the silicon substrate 200 are performed in turn to define the position of the core region 235.

The attenuation region 255 is next fabricated. As shown in FIG. 2D, a sol-gel material 250 of Embodiment 1 added with a photo initiator (2.5%–10%) is coated on the silicon substrate 200 having the core region 235, which is then pre-baked for a period of time. A mask layer 246 having another opening is formed on the sol-gel material 250 thereafter. Exposure, removal of the mask layer 246, removal of the sol-gel material 250 below the mask layer 246 by developing, and baking the silicon substrate 200 are further performed in turn to define the position of the attenuation region 255. Referring to FIG. 2F that shows another cross-section of the buried waveguide structure, the attenuation region 255 is deployed inside the core region 235. In addition, the developing step is performed by a wet-etching process.

Figure 2E:
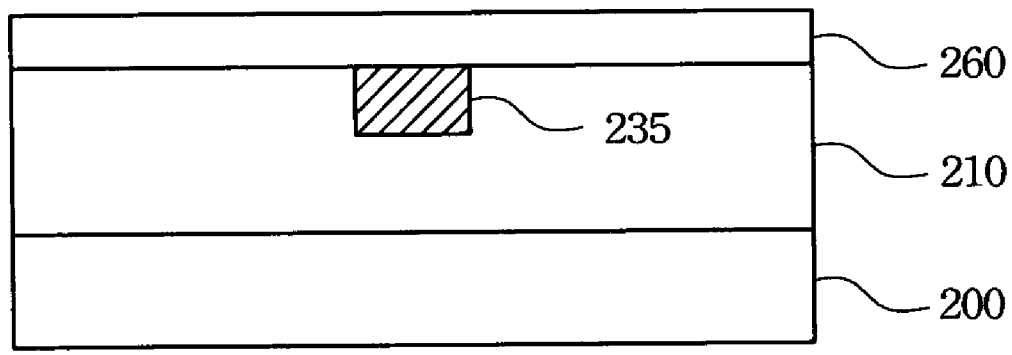
Figure 2F:
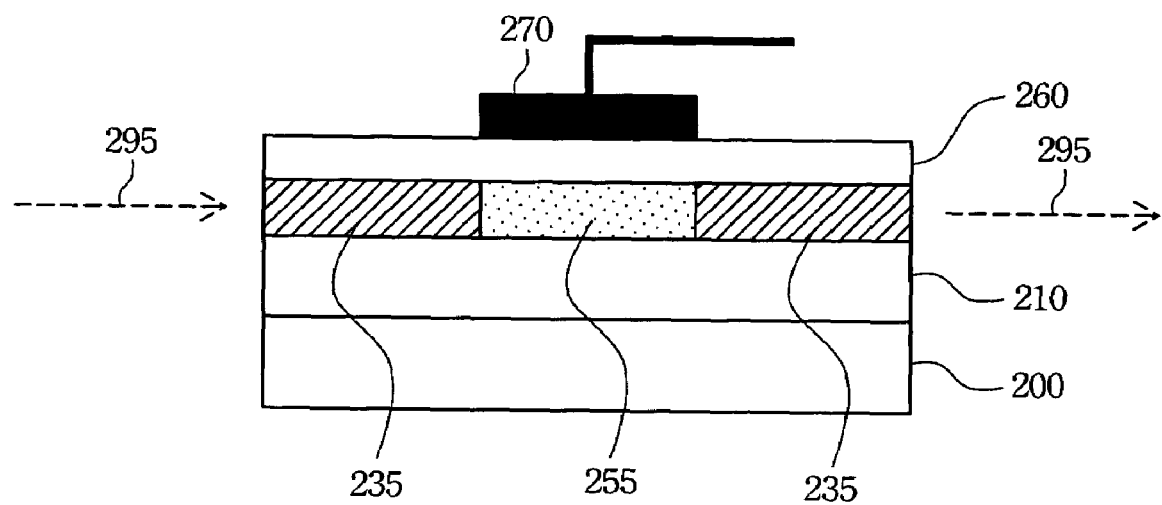

Referring to FIG. 2E, a top cladding 260 is formed on the silicon substrate 200 having the attenuation region 255 (not shown in FIG. 2E) and the core region 235. The refractive indices of the top cladding 260 and the anterior bottom cladding 210 are smaller than those of the attenuation region 255 and the core region 235. FIG. 2F illustrates another cross-sectional view of the main body of the buried waveguide structure along the light-proceeding direction 295. As shown in FIG. 2F, an electrode 270 is disposed on the top cladding 260, and is aligned above the attenuation region 255 of the waveguide structure. As a result, the fabrication of a variable optical attenuator derived from a sol-gel material is accomplished. The core region 235 not only conducts light proceeding therein, but also connects the variable optical attenuator with other optical components, such as fibers. The refractive index of the attenuation region 255 made of the sol-gel material 250 is changed due to heat variation supplied by the electrode 270. In the meantime, the attenuation of light is adjusted after the light passes through the core region 235.

Moreover, the aforesaid buried waveguide structure is only an exemplar to depict how to make a variable optical attenuator by a sol-gel material and a photolithography process. It's thus appreciated that a variable optical attenuator using similar concept, materials or processes will not deviate from the spirit and scope of the invention. For instance, a variable optical attenuator based on a ridge waveguide structure is fabricated by means of the sol-gel material and the photolithography process.

Figure 3:
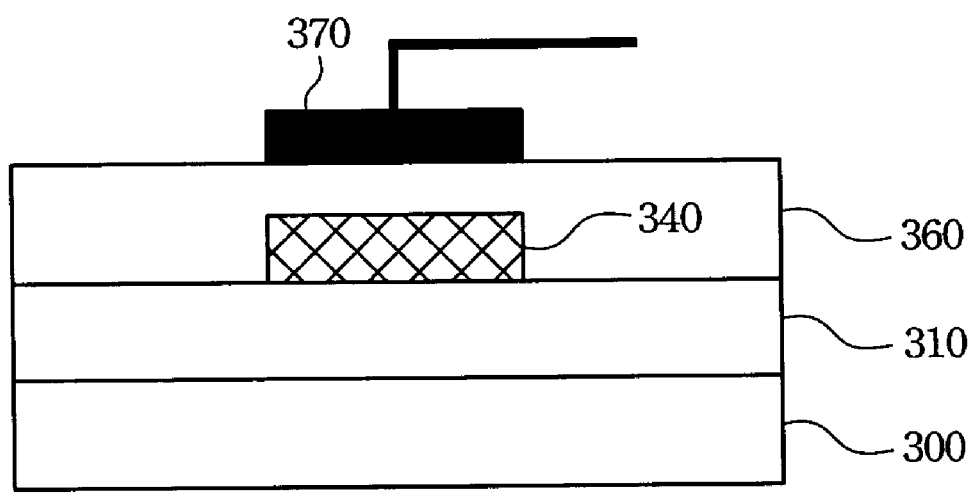
FIG. 3 illustrates a cross-section of a variable optical attenuator in accordance with still another preferred embodiment of the present invention.

FIG. 3 shows a cross-section of a variable optical attenuator made from the previous sol-gel material in still another preferred embodiment of the invention. A bottom cladding 310 is formed on a silicon substrate 300, as illustrated in FIG. 3. Then, a ridge waveguide structure 340, made of a photosensitive material and a sol-gel material, is defined on the bottom cladding 310 through photolithography processes. The ridge waveguide structure 340 further includes a core region (derived from the photosensitive material) for transmitting light and an attenuation region (derived from the sol-gel material) for attenuating the transmitted light. A top cladding 360 is next formed on the ridge waveguide structure 340 and the bottom cladding 310. Furthermore, the refractive indices of the top cladding 360 and the bottom cladding 310 are smaller than that of the waveguide structure 340. Thereafter, an electrode 370 is deployed on the top cladding 360 and is aligned above the attenuation region of the ridge waveguide structure 340. When heat is supplied for the attenuation region by the electrode 370, the refractive index of the sol-gel material changes resulting in the attenuation of light. On the other hand, a substrate with lower refractive index than a waveguide structure may be used as a bottom cladding of a variable optical attenuator. The waveguide structure formed directly on the substrate and covered by a top cladding is also capable of guiding light.

Figure 4A:
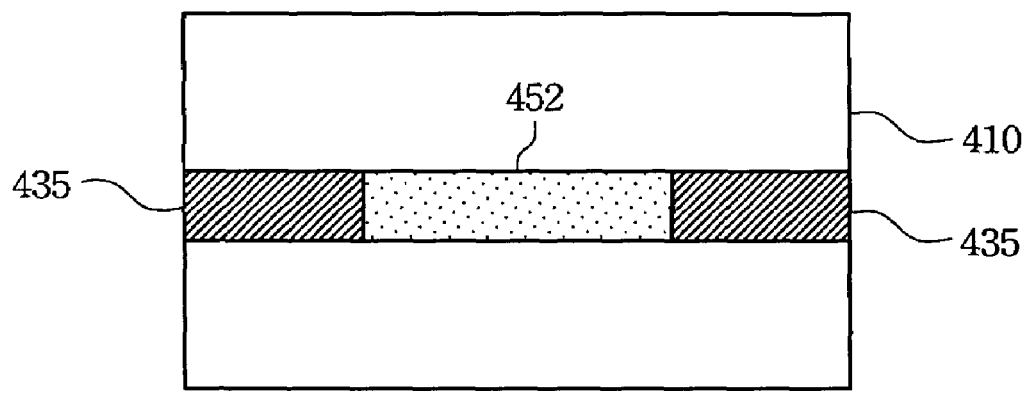
FIG. 4A illustrates a vertical view of a variable optical attenuator with a channel type attenuation region.
Figure 4B:
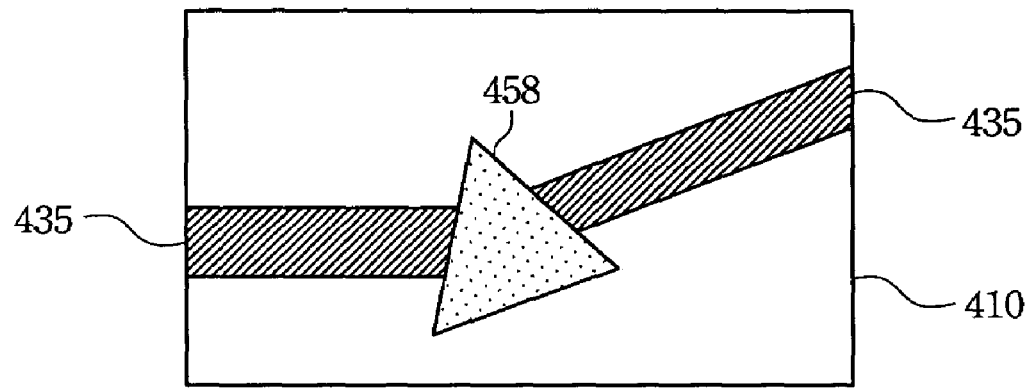
FIG. 4B illustrates a vertical view of a variable optical attenuator having a prism-assisted attenuation region.

Additionally, a channel structure or a prism-assisted structure further constitutes the attenuation region of the previous buried waveguide structure or the ridge waveguide structure. Referring to FIGS. 4A and 4B, which show vertical views of variable optical attenuators with a channel type attenuation region or a prism-assisted type one, respectively. A waveguide structure on a bottom cladding 410 is composed of a core region 435 and a channel type attenuation region 452, as illustrated in FIG. 4A. A portion of light transmitted though the core region 435 and the channel type attenuation region 452 doesn't pass through the waveguide structure farther, as soon as the refractive index of the channel type attenuation region 452 is altered by applying currents to an electrode above the channel type attenuation region 452. Therefore, the transmitted light is attenuated. FIG. 4B illustrates another waveguide structure including a core region 435 and a prism-assisted type attenuation region 458 on a bottom cladding 410. In this embodiment, light transmitted through the core region 435 and the prism-assisted type attenuation region 458 deflects due to the refractive index variation of the prism-assisted type attenuation region 458 induced by an electrode above the prism-assisted type attenuation region 458. As a result, the transmitted light transmits less along another core region 435. The goal to attenuate the transmitted light is thus achieved.

According to the aforementioned preferred embodiments of the present invention, a variable optical attenuator derived from a sol-gel material costs less and is constructed by a photolithography process. Hence, mass production of such variable optical attenuator is practicable. Furthermore, the variable optical attenuator using the sol-gel material and the photolithography process is miniaturized and integrated with other optical components easily. Therefore, an integrated optical module is fabricated effectively according to the variable optical attenuator.

While the invention has been particularly shown and described with reference to the preferred embodiments thereof, these are, of course, merely examples to help clarify the invention and are not intended to limit the invention. It will be understood by those skilled in the art that various changes, modifications, and alterations in form and details may be made therein without departing from the spirit and scope of the invention, as set forth in the following claims.

What is claimed is:

1. A variable optical attenuator derived from a sol-gel material, the attenuator comprising:
   a substrate;
   a waveguide structure formed on the substrate, wherein the waveguide structure has a core region and an attenuation region made of a sol-gel material, wherein a refractive index of the attenuation region is changed to adjust the light passed thereof;
   a bottom cladding formed between the substrate and the waveguide structure, wherein the bottom cladding further comprises a trench and the waveguide structure is formed in the trench; and
   a top cladding formed on the substrate and the waveguide structure.

2. The attenuator of claim 1, further comprising:
   an electrode disposed on the top cladding and aligned above the attenuation region of the waveguide structure.

3. The attenuator of claim 1, wherein the sol-gel material comprises a resultant of a metal alkoxide with an organically modified Si-alkoxide.

4. The attenuator of claim 3, wherein the metal alkoxide comprises zirconium butoxide and the organically modified Si-alkoxide comprises methacryloxypropyl tri-methoxysilane.

5. The attenuator of claim 4, wherein the zirconium butoxide is proportional to the methacryloxypropyl tri-methoxysilane in a molar ratio of from about 1:1 to about 1:10.

6. The attenuator of claim 4, wherein the zirconium butoxide is proportional to the methacryloxypropyl tri-methoxysilane in a molar ratio of from about 1:2 to about 1:5.

7. The attenuator of claim 1, wherein the core region comprises a photosensitive material.

8. The attenuator of claim 1, wherein the attenuation region is a channel type attenuation region or a prism-assisted type attenuation region.

9. A method of manufacturing a variable optical attenuator derived from a sol-gel material, the method comprising the steps of:
   forming a core region on a substrate;
   coating a sol-gel material onto the substrate and the core region;
   providing a mask layer with an opening on the sol-gel material;
   performing an exposure process to expose the sol-gel material;
   removing the sol-gel material under the mask layer and preserving the sol-gel material under the opening of the mask layer to be an attenuation region;
   baking the substrate; and forming a top cladding on the substrate, the core region, and the attenuation region.

10. The method of claim 9, wherein the step of forming the core region on the substrate, comprising:
coating a photosensitive material onto the substrate;
providing another mask layer with another opening on the photosensitive material;
performing an exposure process to expose the photosensitive material;
removing the photosensitive material under the mask layer and preserving the photosensitive material under the opening of the mask layer; and
baking the photosensitive material.

11. The method of claim 9, further comprising the step of forming a bottom cladding on the substrate and a trench on the bottom cladding prior to the step of forming the core region on the substrate.

12. The method of claim 9, further comprising the step of preparing the sol-gel material and the step of adding a photo initiator in the sol-gel material prior to the step of coating the sol-gel material onto the substrate and the core region.

13. The method of claim 12, wherein the step of preparing the sol-gel material, comprising:
dissolving zirconium butoxide in a first solvent to form a first solution, wherein the zirconium butoxide weighs approximately the same as the first solvent;
dissolving methacryloxypropyl tri-methoxysilane in a second solvent in a weight ratio of about 1:2 to form a second solution;
mixing the first solution and the second solution to form a mixture;
heating the mixture; and
transferring the mixture into a third solvent, wherein the boiling point of the third solvent is higher than those of the first solvent and the second solvent.

14. The method of claim 13, wherein the molar ratio of the zirconium butoxide to the methacryloxypropyl tri-methoxysilane is about 1:1 to about 1:10.

15. The method of claim 13, wherein the molar ratio of the zirconium butoxide to the methacryloxypropyl tri-methoxysilane is about 1:2 to about 1:5.

16. The method of claim 9, farther comprising the step of pre-baking the substrate prior to the step of proving the mask layer.

17. The method of claim 9, wherein the step of removing the sol-gel material under the mask layer comprises using a wet-etching process.

18. A prism-assisted type variable optical attenuator, the attenuator comprising:
a substrate;
a bottom cladding formed on the substrate;
a waveguide structure having a core region and a prism-assisted type attenuation region formed on the bottom cladding;
a top cladding formed on the bottom cladding and the waveguide structure; and
an electrode disposed on the top cladding and aligned above the prism-assisted type attenuation region of the waveguide structure.

19. The attenuator of claim 18, wherein the prism-assisted type attenuation region comprises a sol-gel material comprising a resultant of a metal alkoxide with an organically modified Si-alkoxide.

20. The attenuator of claim 19, wherein the metal alkoxide comprises zirconium butoxide and the organically modified Si-alkoxide comprises methacryloxypropyl tri-methoxysilane.

21. The attenuator of claim 20, wherein the zirconium butoxide is proportional to the methacryloxypropyl tri-methoxysilane in a molar ratio of from about 1:1 to about 1:10.

22. The attenuator of claim 20, wherein the zirconium butoxide is proportional to the methacryloxypropyl tri-methoxysilane in a molar ratio of from about 1:2 to about 1:5.

23. The attenuator of claim 18, wherein the core region comprises a photosensitive material.

24. The attenuator of claim 18, wherein the bottom cladding further comprises a trench, and the waveguide structure is formed in the trench.

* * * * *